Figure 2:
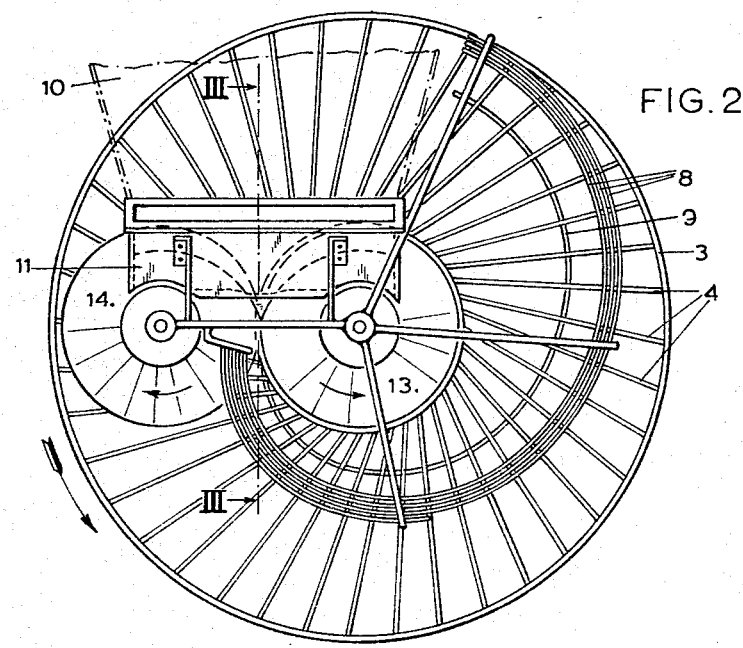

Sept. 27, 1966   J. M. VAN DEN MUNCKHOF   3,275,137
FRUIT SIZING AND SORTING MACHINE
Filed Feb. 3, 1964

INVENTOR
Jan Martin van den Munckhof

BY  *Armine and Smiley*

ATTORNEY

3,275,137
FRUIT SIZING AND SORTING MACHINE
Jan M. van den Munckhof, 65 Meterikseweg,
Horst, Limburg, Netherlands
Filed Feb. 3, 1964, Ser. No. 341,893
Claims priority, application Italy, Feb. 13, 1963, 3,167/63
9 Claims. (Cl. 209—99)

The present invention relates to a machine for sorting in sizes of fruit or other articles, for example tomatoes, comprising a bearing member, which is permitted to be rotated round a vertical axis through its centre by means of a driving device.

With a known sorting machine the fruit is supplied to the outer periphery of the bearing member in an annular plate thereof. The bearing member is surrounded by one or more not rotating sorting slots. A disadvantage of the known machine is, that the fruit is pressed through the sorting slots by the centrifugal force and by the force of gravity, owing to which damage can take place to easy vulnerable fruit, such as tomatoes. The chance of damage is increased by the fact, that the fruit in the sorting slots is only contacted at two points. This means that the fruit is only measured at two places, through which the three dimensional fruit is badly sorted.

The sorting machine according to the invention avoids the above mentioned disadvantages. The machine in accordance with the invention is characterised in that the bearing member is formed by a hub provided with a number of spokes, which are fixed to the hub under equal angular distances, and in that a guide member is fixedly mounted above and loose of the bearing surface formed by the spokes, said guide member comprising one or more parts and extending substantially along a part of a spiral from near said centre over said bearing surface. The fruit is supplied to the bearing surface near the axis of rotation. By this construction a simple and cheap sorting machine is obtained with a large capacity. The fruit is measured at three places, through which an exact sorting is obtained, while the chance to damage to the fruit is very small owing to contact at three points.

Sorting machines of another type are known in which sorting takes place by means of substantially parallel diverging bars or threads, but these machines are considerably more complicated and costly than the machine in accordance with the invention.

Preferably each spoke is mounted out of the radial plane and crosses the guide member at a right angle so as to provide rectangular sorting openings.

Preferably the bearing surface formed by the spokes is conical owing to which the fruit is moved to the periphery of the bearing member by means of the force of gravity.

When a guide bar is fixedly mounted under the bearing surface and inwards of the guide member extending along a part of a spiral, a more exact sorting of the often substantially cubic tomatoes is possible, whereby the fruit is supported at four places.

The guide member can be formed by one or more strips having a smooth guide surface.

A good operation of the machine in accordance with the invention is particularly ensured, when a first and a second cone are rotatably mounted above the bearing surface, said cones forming a V-shaped aperture, the outlet of a chute for the fruit to be sorted is mounted at the one side of said aperture and the guide member corresponds with the other side of said aperture.

Preferably the first cone is fixed to said bearing member and the second cone is driven by the first cone.

Figure 1:
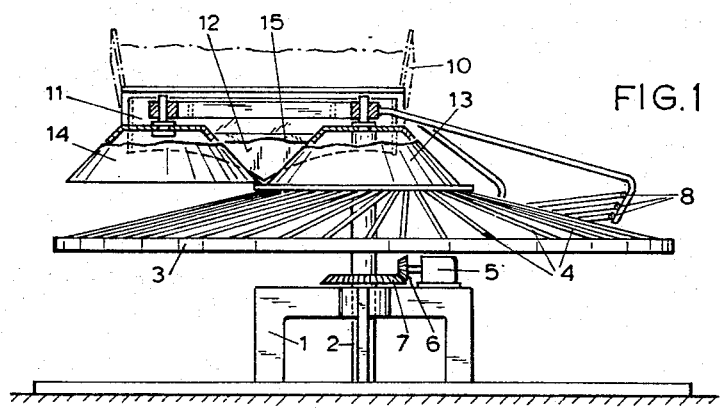
Figure 3:
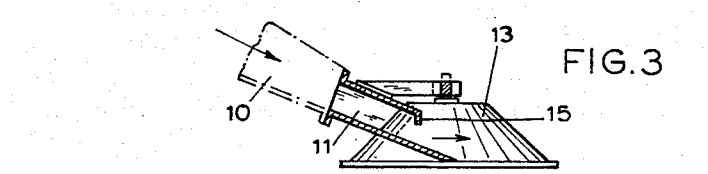

For the elucidation of the invention reference is made to the accompanying drawing which shows an embodiment of a sorting machine in accordance with the invention. In the drawing:

FIG. 1 is a plan view of the sorting machine;
FIG. 2 is a side view of the machine shown in FIG. 1;
FIG. 3 is a section on an enlarged scale of an outlet part of a feed chute.

The hub 2 of the conical bearing member 3 is bearing rotatable in the frame 1 of the sorting machine. The bearing, or fruit supporting, surface of the member 3 is formed by a number of bars, threads or spokes 4, which extend at equal angles from the centre to the outer periphery of the bearing member 3. Preferably the spokes do not extend in radial planes. Instead of being straight the spokes also can extend to the periphery in the form of equal spirals. By means of a motor 5 and gearing wheels 6 and 7 the bearing surface is driven in the direction of the arrow.

Further a spiral guide member comprising the strips 8 is fixedly mounted to the frame 1. The lower edge of the guide member is placed at a distance of the bearing surface formed by the spokes 4, which distance is smaller than the dimensions of the smallest fruits to be sorted. A guide bar 9 is mounted to the frame 1 of the machine under the bearing surface by the spokes 4 and inwards of the spiral guide strips 8. Thereby the tomatoes to be sorted are supported on four places, whereby an exact sorting becomes possible. By means of the spokes 4 being arranged in planes not extending radially, said spokes crossing the guide strips 8 and the guide bar 9 at right angles and square instead of lozenge openings are formed. The strips 8 of the guide member and the guide bar 9 are placed along a part of a spiral having the hub 2 in its centre. Gutters or boxes can be placed under the bearing member and under the guide member for catching the sorted fruit.

For getting a good sorting it is necessary, that the fruit is put on the bearing surface between the spokes in only one row thick. For that purpose the end of the supply gutter 10 is provided at one side of a V-shaped aperture 12 formed by a part of a first cone 13 and a part of a second cone 14. The first cone is rigidly fixed to the bearing member 3 in the centre of it and is together with the bearing member driven by the motor 5. The second cone 14 is rotatably mounted with its outer periphery touching the outer periphery of the first cone 13 for causing it to be driven by the latter cone. The strips 8 of the guide member start at the other side of the V-shaped aperture 12 at a radius equal to or larger than the radius of the outer wall of the aperture 12.

During sorting for instance tomatoes are supplied through the gutter 10 into its end 11. The tomatoes lying partly on one of the rotating cones 13 or 14 are caused to roll in the direction of the aperture 12. In the aperture 12 each tomato driven by both cones will pass out and onto the bearing member, except the upper of two tomatoes lying one on the other, as the upper one is arrested by the bridge 15. On the other side of the aperture 12 each tomato rolls above parts of two spokes 4. The bearing member 3 carries the tomato on its spokes in the direction of the arrow. During this movement the tomato is moved in an outside direction along the spokes 4 the distance between which increases steadily, however the tomato is arrested by the guide strips 8. Also the distance between the guide strips 8 and the guide bar 9 increases. The tomato is carried further until the opening under it is so large, that it can pass through. At this place a box is provided under the bearing member 3 for catching all tomatoes of the size of the latter one.

What is claimed is:

1. A machine for sorting to size fruit, or the like, comprising a substantially vertical hub, means for rotating the hub about its axis, a plurality of substantially equiangularly spaced, outwardly directed spokes fixed to the hub and forming a fruit supporting surface, and a stationary guide member above and spaced from said fruit supporting surface and extending substantially in a spiral from near said hub toward the outer edge of said fruit supporting surface, each pair of said spokes cooperating with the guide member to form a three sided sorting slot for the fruit which increases in size as the fruit supporting surface turns with respect to the stationary guide member.

2. A sorting machine according to claim 1, wherein each spoke crosses below the guide member at a substantially right angle.

3. A sorting machine according to claim 1, wherein said fruit supporting surface formed by the spokes is conical.

4. A machine for sorting to size fruit or the like, for example tomatoes, comprising a bearing member, means for rotating the bearing member about a vertical axis through its centre, said bearing member being formed by a hub having a number of equiangularly spaced spokes, a guide member fixedly mounted above and spaced from the fruit supporting surface formed by said spokes, said guide member extending substantially along a spiral starting from near said center, and a spiral guide bar fixedly mounted under said fruit supporting surface and inwards of the guide member.

5. A sorting machine according to claim 4, characterised in that each spoke crosses the guide member and the guide bar at substantially right angles.

6. A sorting machine according to claim 4, characterised in that the guide member is formed by one or more strips having a smooth guide surface.

7. A machine for sorting to size fruit or the like, for example tomatoes, comprising a bearing member, means for rotating the bearing member about a vertical axis through its centre, said bearing member being formed by a hub having a number of equiangularly spaced spokes, a guide member fixedly mounted above and spaced from the fruit supporting surface formed by said spokes, said guide member extending substantially along a spiral starting from near said center, a first and a second cone rotatably mounted above said fruit supporting surface, said cones forming a V-shaped aperture, an outlet of a feed chute for the fruit to be sorted mounted at the one side of said aperture, and said guide member starting at the other side of said aperture.

8. A sorting machine according to claim 7 characterised in that the first cone is fixed to said bearing member and the second cone is driven by the first cone.

9. A machine for sorting to size fruit, or the like, comprising a substantially vertical hub, means for rotating the hub about its axis, a plurality of substantially equiangularly spaced, outwardly directed straight spokes fixed to the hub and forming a fruit supporting surface, and a stationary guide member above and spaced from said fruit supporting surface and extending in a spiral from near said hub toward the outer edge of said fruit supporting surface, each pair of said straight spokes cooperating with the guide member to form a three sided sorting slot for the fruit which increases in size as the fruit supporting surface turns with respect to the stationary guide member.

References Cited by the Examiner

FOREIGN PATENTS 17,859     1897     Great Britain.
559,476    3/1957   Italy.

ROBERT B. REEVES, *Primary Examiner.*